United States Patent
Talbot et al.

(10) Patent No.: US 9,622,405 B2
(45) Date of Patent: Apr. 18, 2017

(54) ADJUSTABLE HOLD-DOWN ASSEMBLY FOR A SICKLE CUTTER SYSTEM

(71) Applicant: MacDon Industries Ltd., Winnipeg (CA)

(72) Inventors: Francois R. Talbot, Winnipeg (CA); Dory Parsonage, Winnipeg (CA)

(73) Assignee: Macdon Industries Ltd., Winnipeg, MB (CA)

( * ) Notice: Subject to any disclaimer, the term of this patent is extended or adjusted under 35 U.S.C. 154(b) by 461 days.

(21) Appl. No.: 14/104,129

(22) Filed: Dec. 12, 2013

(65) Prior Publication Data

US 2015/0163995 A1   Jun. 18, 2015

(51) Int. Cl.
A01D 34/18 (2006.01)
A01D 34/17 (2006.01)
A01D 34/14 (2006.01)

(52) U.S. Cl.
CPC ............ *A01D 34/17* (2013.01); *A01D 34/14* (2013.01); *A01D 34/18* (2013.01)

(58) Field of Classification Search
CPC ................................ A01D 34/17; A01D 34/18
USPC ............................. 56/298, 305, 307, 308, 310
See application file for complete search history.

(56) References Cited

U.S. PATENT DOCUMENTS

| | | | | |
|---|---|---|---|---|
| 1,576,264 A * | 3/1926 | Beckwith | ............... | A01D 34/17 56/305 |
| 3,314,222 A * | 4/1967 | Scarnato | ............... | A01D 34/14 56/305 |
| 3,455,093 A * | 7/1969 | Stern | ............... | A01D 34/17 56/305 |
| 3,715,845 A * | 2/1973 | Braunberger | ............ | A01D 34/17 56/305 |
| 3,722,196 A * | 3/1973 | Templeton | ............ | A01D 34/16 56/298 |
| 3,978,645 A * | 9/1976 | Bennett | ................ | A01D 34/18 56/310 |
| 4,553,380 A * | 11/1985 | O'Halloran | ............ | A01D 34/17 56/298 |
| 4,894,979 A | 1/1990 | Lohrentz | | |
| 4,909,026 A | 3/1990 | Molzahn | | |
| 5,343,682 A * | 9/1994 | Puncochar | ............ | A01D 34/17 56/305 |

(Continued)

*Primary Examiner* — Thomas B Will
*Assistant Examiner* — Mai Nguyen
(74) *Attorney, Agent, or Firm* — Adrian D. Battiso; Ade & Company Inc.

(57) ABSTRACT

A sickle cutting apparatus includes a plurality of triple finger knife guards which are arranged side by side along the cutter bar to cooperate with a reciprocating sickle bar carrying a row of double blade knife sections and a set of hold-down members carrying hold-down fingers. The hold-down members are arranged alternately as a single finger and double finger with each hold-down member being connected to the cutter bar in association with a respective triple guard. In this way the hold-down fingers are arranged at alternate guard fingers leaving the intervening guard fingers open. The system includes both pointed guards with no tang and stub guard so that the user can select either to be used with the hold-downs. The hold down fingers are all individually adjustable so that the double hold-down have two adjustment screws which can be individually operated causing flexing of the bridge between the double fingers.

14 Claims, 9 Drawing Sheets

(56) References Cited

U.S. PATENT DOCUMENTS

| | | |
|---|---|---|
| 6,962,040 B2 | 11/2005 | Talbot |
| 7,275,358 B2 * | 10/2007 | Blakeslee .............. A01D 34/40 56/289 |
| 7,328,565 B2 | 2/2008 | Snider |
| 2013/0192188 A1 | 8/2013 | Talbot |
| 2014/0033672 A1 * | 2/2014 | Talbot ................... A01D 34/13 56/298 |

* cited by examiner

ADJUSTABLE HOLD-DOWN ASSEMBLY FOR A SICKLE CUTTER SYSTEM

This invention relates to an adjustable hold-down guard assembly for the sickle knife of a crop cutting apparatus such as a swather or combine harvester.

BACKGROUND OF THE INVENTION

The present invention relates generally to a crop cutting device comprising a plurality of knife guards arranged to be mounted in spaced relation along a cutter bar and projecting forwardly therefrom in transverse alignment; each of the guards having an upwardly facing ledger surface with opposed side edges thereof arranged to provide first and second shearing edges; a sickle bar mounted in transversely extending position and being driven for reciprocating movement relative to the knife guards; the sickle bar having a plurality of knife blades mounted thereon for movement therewith; each of the knife blades having a cutting surface for passing across the ledger surface of the knife guards and an opposed surface; each of the knife blades having two side cutting edges which are beveled from the opposed surface to the cutting surface to cooperate with the shearing edges of the knife guards; the sickle bar being driven to carry the knife blades back and forth between the knife guards.

It is well known that many sickle knives of this general type include a conventional or pointed guard where the guard is formed as an integral element which includes a base piece attached to the cutter bar and defining the ledger surface and a nose piece projecting forwardly from the ledger surface in front of the front edge of the blade which is generally pointed at a leading end so as to separate the crop to each side of the guard. This nose piece also stands up in front of the ledger surface to protect the front edge of the blade and includes a rearwardly extending shelf over the ledger surface which forms a slot with the ledger surface through which the blade passes. Guards of this type include separate hold down members between the guards which apply downward pressure on the cutter bar to press the blades against the ledger surface.

Pointed guards generally feature a point with a cut slot that the sickle blades reciprocate in and out of. Various types of hold-down arrangement are used to apply pressure to the sickle to keep its shearing surface in close contact with the guard ledger as cutting occurs. Usually these are located between the guard point or at the rear edge of the sickles. Most are sheet metal and feature easy adjustment using a hammer or a simple single point threaded adjustment. By keeping the hold-downs separate from the guards fewer hold-downs than points may be used to reduce the cost and number of adjustments required. Pointed guards have found much favor in easier cutting conditions due to the ease of adjustment and superior performance.

Another form of guard is known as a stub guard which is formed in two separate pieces including a base piece which carries the ledger surface and a top piece which extends over the ledger surface. The pieces are separate and separately adjustable relative to the cutter bar so that the top piece can apply pressure onto the blade to press it onto the ledger surface. The pieces terminate at a front edge which is just behind the front edge of the blade so that the front edge of the blade is presented to the crop.

In tough cutting, stub or no-clog guards have found the most favor. Stub guards use a separate top and bottom guard pieces that spaced slightly more than one sickle blade thickness apart create a slot for the blade to operate in. The front edge of the blade protrudes slightly past the front tip of the two guards. This feature is what originally gave stub-guards their non-clogging self-cleaning action. A major improvement in stub guard technology was made when fully adjustable top hold-down assemblies were introduced. These arrangements allowed the gap to be controlled much more precisely than previously so that the shearing surface of the blade was kept in close contact with the guard ledger surface. This adjustability allows the stub top piece to act as a much more effective hold-down than the hold-downs found on regular pointed guard systems.

The pointed guard has an advantage of presenting a point to the incoming crop so that crop is effectively divided around it. This is especially advantageous when the sickle blade is at or near the end or start of each stroke and a front edge of each blade, which is typically a blunt front edge of a width of the order of 0.5 inch, is hidden partially or entirely within the guard slot. Since the sickle bar velocity is lowest at or near the end or start of each stroke this gives the pointed guard a considerable advantage over the stub guard for most crops.

The guards can be formed as single elements separately mounted on the guard bar or as double or triple elements connected together side by side for common mounting and common adjustment relative to the guard bar. There is no reason why more elements might be included but this is not typical.

In some cases the arrangement is of the double sickle type where each sickle bar is essentially half the length of the cutter bar and the cutter bars reciprocate in opposite phase to minimize vibrating mass and vibrations. Usually the sickle bars are timed so that they move in opposite directions so that vibrations induced into the cutter bar assembly are minimized.

The sickle knife cutting system has been widely accepted as the most power efficient system due to the shearing action. However due to speed restrictions of generally less than 5 to 8 mph ground speed, other systems such as rotating flail systems have come into use since these can be operated at much higher ground speed of up to 14 mph while maintaining a high cutting efficiency. Such rotary systems have however much higher power usage, are limited in width and provide crop handling difficulties for forming effective swaths for drying of the crop.

Cutting crops such as soy beans where the bean pods can be located closely adjacent the ground typically requires low ground speeds of around 4 to 5 mph to ensure that the crop is cut and fed into the combine harvester without too much loss of the pods. Pods can be lost if the cutting action causes some or too many of the lowest pods to be left at the stubble or broken up by the cutting action. It would be highly desirable to increase cutting speed above the typical range of 4 to 5 mph so as to increase this to or above 6 mph.

Cutting crops such as hay or forage crops such as alfalfa or grasses typically allows higher ground speeds of up to 10 mph since the crop is more resistant to a poor or inefficient cutting action. It would be highly desirable to increase cutting speed above the typical range of up to 10 mph so as to increase this to or above 12 or even 14 mph.

The term "sickle bar" as used herein is intended to refer generally to a structure which supports all of the knife blades at the spaced positions along its length and is not intended to be limited to a single continuous element extending along the whole length of the structure. Thus the bar may be formed of different elements at different parts of the length and may include pieces below and above the blades.

SUMMARY OF THE INVENTION

According to one aspect of the invention there is provided a sickle cutting apparatus comprising:

a plurality of stationary knife guards arranged to be mounted along a cutter bar;

a sickle bar mounted in transversely extending position and arranged to be driven for reciprocating movement relative to the knife guards;

the sickle bar having a plurality of knife blades mounted thereon for movement therewith;

each of the knife blades having a cutting surface for passing across the knife guards;

each of the knife blades having on first and second sides first and second side cutting edges;

each knife guard comprising:
  a base portion arranged to be mounted on the cutter bar;
  at least one guard finger mounted on the base portion so that the guard fingers are arranged to be mounted in a row along the cutter bar;
  each guard finger having an upwardly facing ledger surface with opposed side edges thereof arranged to provide first and second shearing edges which cooperate with the side cutting edges of the knife blades;

and a plurality of hold-down members arranged to be mounted along the cutter bar;

each hold-down member comprising a base mounting member arranged to be attached to the cutter bar;

each hold-down member comprising two hold-down fingers thereon carried on the base mounting member arranged to be at positions spaced longitudinally of the cutter bar so as to be cantilevered forwardly from the cutter bar to a position of a front tip of each hold-down finger located at a settable spacing in front of the sickle bar above the ledger surface of a respective one of the guard fingers;

wherein each of the base mounting members is arranged to be attached to the cutter bar by at least two threaded fasteners passing through the cutter bar and through the base mounting member which can be adjusted to tighten the base mounting member onto the cutter bar;

the threaded fasteners having axes of the threaded fasteners lying at spaced positions along an imaginary line longitudinally of the cutter bar;

wherein each of the hold-down fingers is arranged to be adjustable on the cutter bar to change the settable spacing thereof;

wherein each of the hold-down fingers is pivotal relative to the cutter bar about a fulcrum extending longitudinally of the cutter bar and located at a position forwardly of the imaginary line;

wherein each of the two hold-down fingers includes a respective adjustment screw for individual adjustment by extension of the adjustment screw located at a position rearwardly of the imaginary line;

and wherein the base mounting member connects the two hold-down fingers and defines a bridge between the two hold-down fingers which is shaped to provide lateral strength and to be sufficiently flexible in torsion to provide the individual adjustments.

Preferably the fulcrum and the adjustment screws are located relative to the imaginary line such that the hold-down fingers are adjustable by extension of the respective adjustment screw to reduce the settable spacing without adjustment of the threaded fasteners.

Preferably the fulcrum is arranged at a position spaced slightly forward of the imaginary line by a distance less than a radius of the threaded fasteners such that there is slight sliding movement of the fulcrum rearwardly when the adjustment screw is extended.

Preferably the fulcrum comprises an apex of a rib along the base mounting member arranged longitudinally of the cutter bar.

Preferably the adjustment screw is behind the threaded fasteners out of the crop flow which allows the adjustment screw to comprise a bolt with a head projecting upwardly from a top surface of the hold-down member.

Preferably the hold-down member including the hold-down fingers and the base mounting member comprises an integral member with a bottom surface including the fulcrum arranged to directly contact an upper surface of the cutter bar with no intervening elements.

Preferably the bridge does not include a trash bar so that the fingers are divided all the way back to a position behind the sickle bar.

Preferably the threaded fasteners each include a shoulder engaging an upper surface of the hold-down member and the upper surface includes a downwardly curved surface at least rearward of the imaginary line to allow rotation of the hold-down member on the shoulder during the extension of the adjustment screw. The relief to the rear of the nuts is more important when adjusting the hold-down finger down. Also the direction of the curved surface is important. However in most cases the whole of the undersurface is arcuately curved on both sides of the imaginary line.

According to another important aspect of the invention there is provided a sickle cutting apparatus comprising:

a plurality of stationary knife guards arranged to be mounted along a cutter bar;

a sickle bar mounted in transversely extending position and arranged to be driven for reciprocating movement relative to the knife guards;

the sickle bar having a plurality of knife blades mounted thereon for movement therewith;

each of the knife blades having a cutting surface for passing across the knife guards;

each of the knife blades having on first and second sides first and second side cutting edges;

each knife guard comprising:
  a base portion arranged to be mounted on the cutter bar;
  at least one guard finger mounted on the base portion;
  each guard finger having an upwardly facing ledger surface with opposed side edges thereof arranged to provide first and second shearing edges which cooperate with the side cutting edges of the knife blades;
  the guard fingers being arranged to be mounted at a first equidistant spacing in a row along the cutter bar;
  the guard fingers defining first and second sets of guard fingers arranged to be mounted alternately along the cutter bar so that each guard finger of the first set is located between respective guard fingers of the second set;

and a plurality of hold-down members arranged to be mounted along the cutter bar;

each hold-down member comprising at least one hold-down finger thereon arranged to extend forwardly from the cutter bar to a position adjacent the knife blades in front of the sickle bar;

the hold-down fingers being arranged to be mounted at a second equidistant spacing in a row along the cutter bar;

wherein the second equidistant spacing of the hold-down fingers is double that of the first equidistant spacing of the guard fingers;

each hold-down finger being arranged to be located in alignment with and at a spacing above a respective one of the second set of guard fingers for holding down a respective one of the knife blades onto the ledger surface of the respective one of the second set of guard fingers.

Preferably the guard fingers of the second set each include no element over the knife blade on the ledger surface thereof so that the knife blade on the ledger surface thereof is held down only by the respective guard finger and the guard fingers of the first set each include no element over the knife blade on the ledger surface thereof so that the knife blade on the ledger surface thereof is not held down.

Preferably a length and width of the ledger surfaces of the first set of guard fingers is equal to a length and width of the ledger surfaces of the second set of guard fingers.

In one arrangement each of the guard fingers comprises a pointed guard finger with a pointed front tip thereof in front of a front tip of the knife blades including an upstanding transverse shoulder at a front edge of the ledger surface.

Preferably there is provided a cutting system including a first plurality of first stationary knife guards each comprising a stub guard finger with a front tip thereof behind a front tip of the knife blades and a second plurality of second stationary knife guards each comprising a pointed guard finger with a pointed front tip thereof in front of a front tip of the knife blades, the first and second stationary knife guards being arranged such that a user can select either the first stationary knife guards or the second stationary knife guards to be mounted on the cutter bar, the first stationary knife guards, the second stationary knife guards and the hold down members are arranged such that the hold down members cooperate with the first stationary knife guards when selected and with the stationary knife guards when selected.

Preferably the spacing of the hold-down fingers above the respective one of the second set of guard fingers is adjustable by an adjustment screw at the cutter bar which can be preferably operated independently of the other hold-down fingers.

Preferably the plurality of hold-down members comprises a plurality of first hold-down members and a plurality of second hold-down members arranged to be mounted alternately along the cutter bar, the first hold-down members having a single one of the hold-down fingers thereon and the second hold-down members having two of the hold-down fingers thereon.

Preferably each knife guard has three fingers mounted on the base portion and wherein each of the first and second hold-down members is associated with a respective one of the knife guards and is arranged to be mounted on the cutter bar commonly therewith.

Preferably a center line spacing between each guard finger and the next is equal to 2.0 inches. However the arrangement can be used with other center line spacings such as the conventional 3 inch spacing.

Preferably a stroke length of the reciprocating movement of the sickle bar is equal to the center line spacing between each guard finger and the next so that each knife blade is moved between a position aligned with a guard finger of the first set and a position aligned with a guard finger of the second set.

Preferably the knife blades are arranged as first and second blades of a connected pair and the reciprocating movement is arranged such that each connected pair is moved in the reciprocating movement between a first position in which the first blade of the pair is aligned with a respective hold down finger and a second position in which the second blade of the pair is aligned with the respective hold down finger.

Preferably at least some of the hold-down members include a hold down ledge arranged above a rear edge of a base of the knife blade.

DETAILED DESCRIPTION

Figure 1:
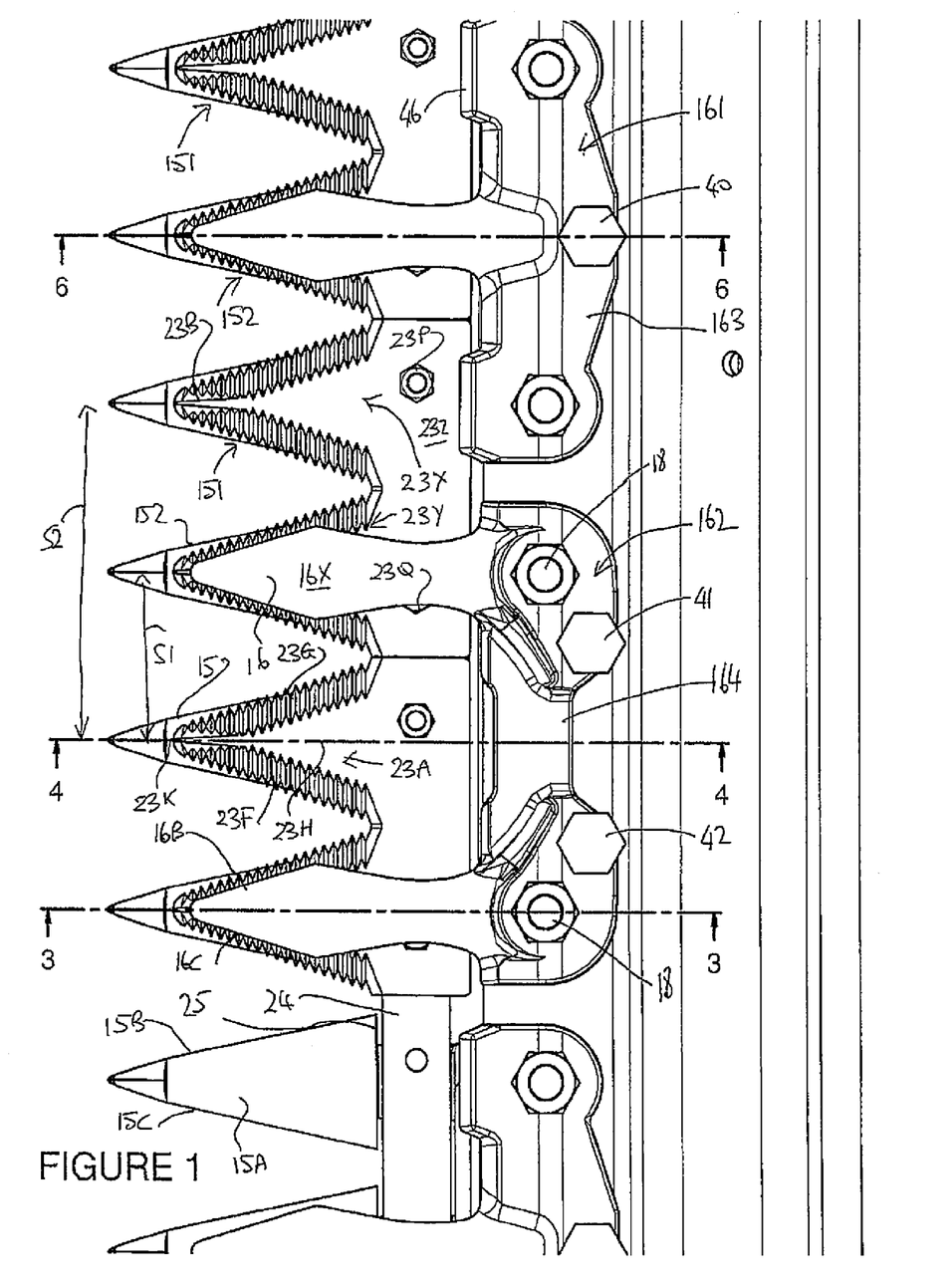
FIG. 1 is a top plan view of a part of header showing a portion of the sickle knife according to a first embodiment of the present invention using a pointed guard.
Figure 2:
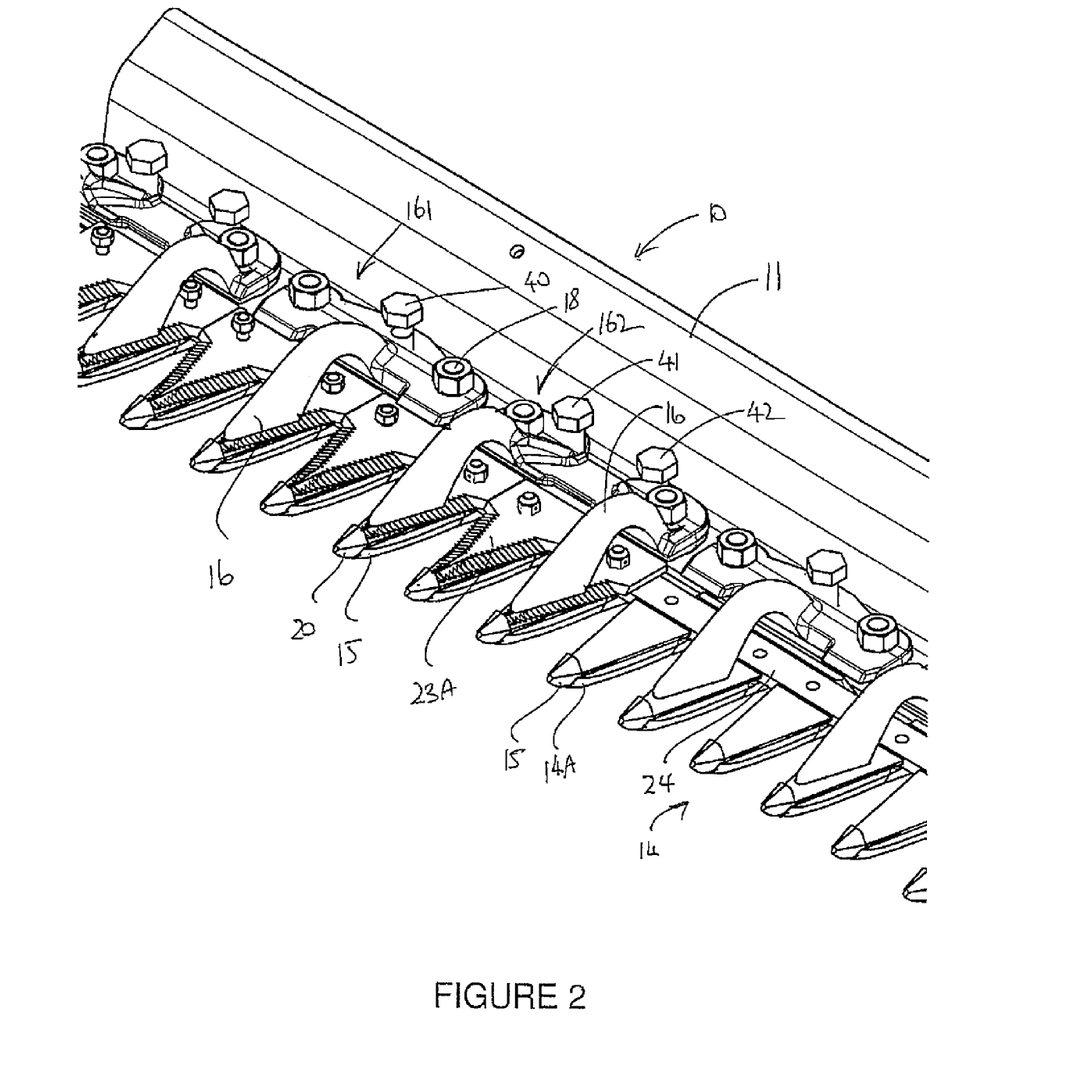
FIG. 2 is an isometric view of the part of the header of FIG. 1.

In FIGS. 1 and 2 is shown a first embodiment of a crop cutting device generally indicated at 10. Only a part of the complete machine is shown since the remainder of the machine may vary widely depending upon requirements and since the construction is of course well known to a person skilled in the art. In this embodiment as shown, there is a frame generally indicated at 11 which forms only one part of the total frame structure that is the part of the frame that is relevant to the present invention.

The cutting device 10 further includes a cutter bar 12 attached to the frame structure 11. Thus the frame structure 11 in the part as shown comprises a guard bar 13 to which is attached a plurality of knife guards 14. The guard bar 13 is attached to the frame structure which supports the guard bar in fixed position across the front edge of the frame for a cutting action of the crop cutting device on the standing crop.

Each knife guard 14 includes three guard fingers 14A arranged in a triple guard but guards can be arranged with a single finger, pair of fingers or triples. As shown the guard bar forms a triple guard construction with three fingers where a series of such guards are mounted on the guard bar 13 at spaced positions along the length of the guard bar.

Figure 7:
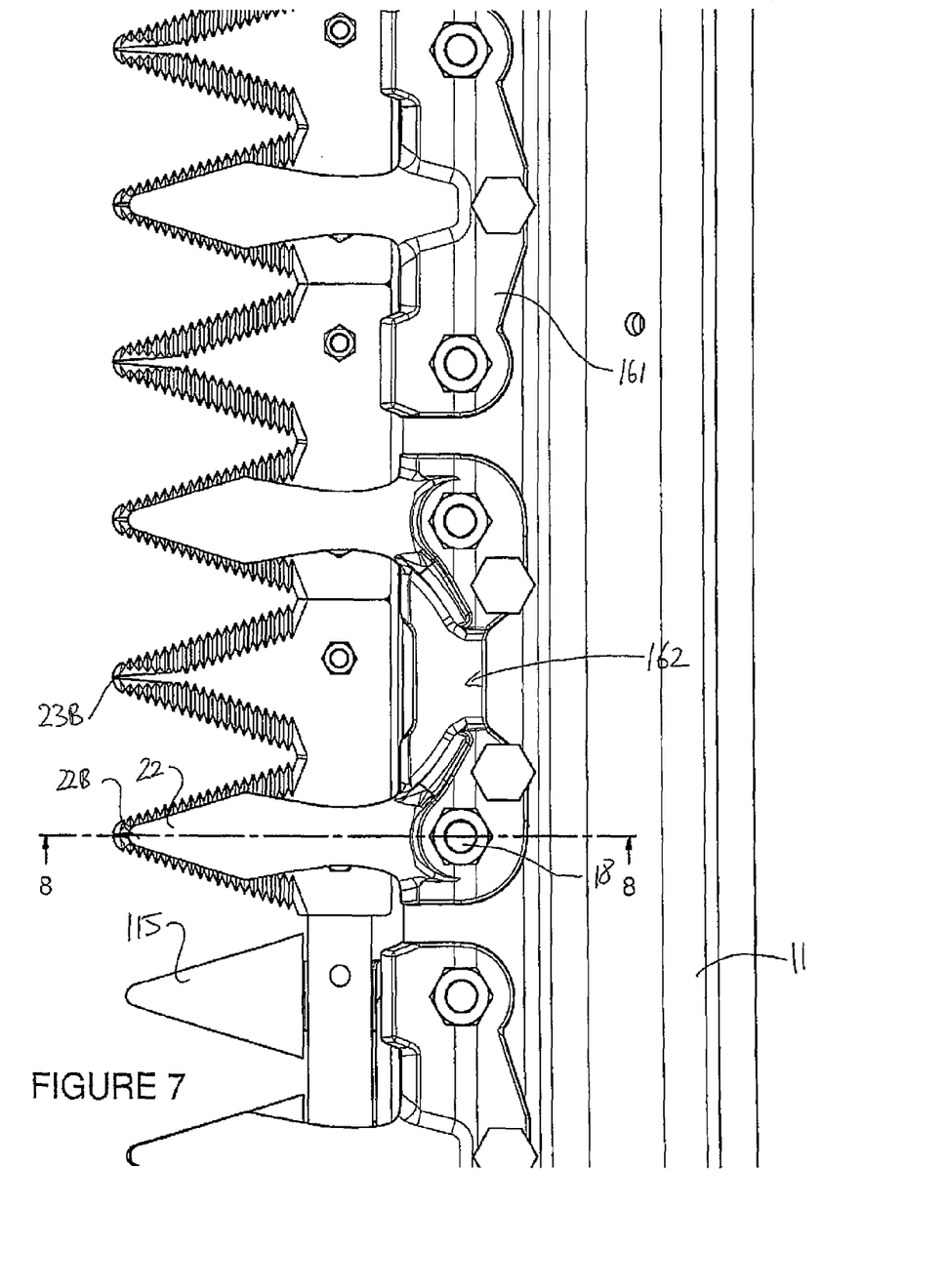
FIG. 7 is a top plan view of a part of header showing a portion of the sickle knife according to a first embodiment of the present invention using a stub guard.

The knife guards can comprise a stub guard as shown in FIG. 7 but shown in FIGS. 1 and 2 each guard finger 14A comprises a pointed guard which includes a lower portion 15 and an upper portion or hold-down finger 16. These two portions are mounted on the guard bar 13 by a mounting arrangement 17 including bolts 18. The mounting arrangement thus attaches a rear end 19 of the lower portion 15 rigidly on the underside of the bar 13 so that the fingers of the guard project forwardly from the bar to a front nose 20. Similarly the hold-down finger 16 is mounted on the guard bar 13 by an adjustment plate 21 attached onto the same bolts 18. Each hold-down finger 16 extends forwardly to a nose 22.

Figure 8:
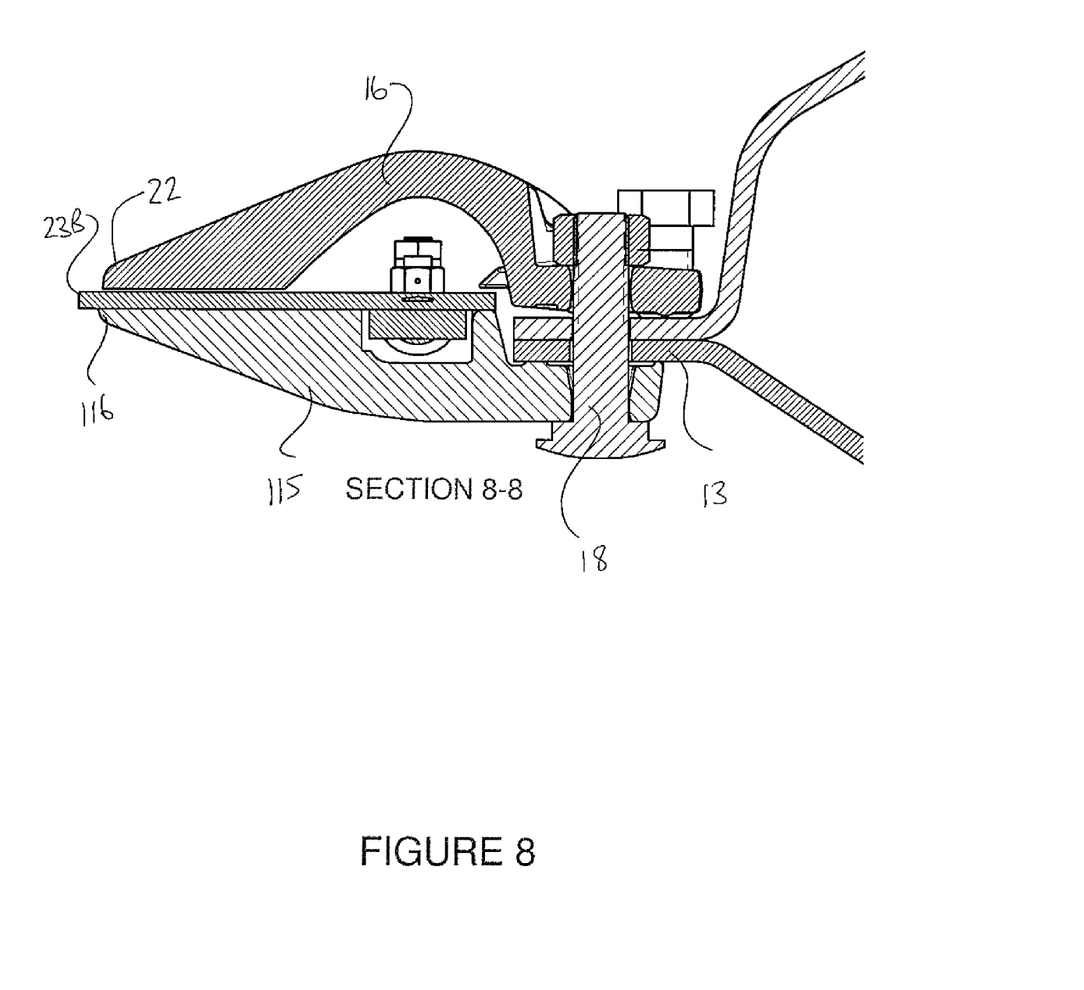
FIG. 8 is a cross-sectional view along the lines 8-8 of FIG. 7.

In the embodiment shown in FIGS. 7 and 8 the guards are stub guards so that the noses 20, 22 substantially overlie one another and confine between them the blades 23 of the sickle bar or knife back 24.

Each pair of guards thus includes two guard elements each defined by an upper portion or hold-down finger 16 and a lower portion or guard finger 15 and the guard elements are shown in FIG. 1. A front crop guide bar or trash bar can be also provided but in the embodiment as shown no such trash bar is included so that the guard fingers 15 are separated and unconnected to each other all the way back to the sickle bar 24. In front of the mounting bar 19 is provided a channel 25 within which the sickle bar or knife back 24 is mounted for reciprocating movement.

The trash bar may form a continuous bar member extending along the lower guard portion 15 in front of the bar 24 to prevent any crop reaching that area. However the trash bar may be formed by any part of the system which prevents the crop from moving rearwardly beyond the rear end of the cutting edges of the blades.

There may be a single sickle bar 24 driven from one end or in some cases there are two sickle bars driven from opposite ends and meeting in the middle. The sickle bar or bars 24 are driven by the reciprocating drive motor (not shown but conventional) such that the bar 24 reciprocates back and forth.

In some cases the bar 24 reciprocates by a distance S1 equal to the space between the nose of one guard fingers 15 and that of the next along the guard bar 13 so that the blades 23 reciprocate from a position with the center line of the knife 23 aligned with the center line of the first guard finger to a position aligned with the next guard finger and back to the first. In other cases, the reciprocation stroke may be as shown at S2 a multiple of, typically double, the distance between the guards so that the knife moves from a first guard finger across a second to a third and back to the first. This arrangement reduces the available reciprocation rate due to increased acceleration forces but reduces the number of reversals.

Each sickle bar comprises the support bar member 24 and the plurality of blades indicated at 23. As shown the blades are formed in pairs mounted on a common base, but individual blades may be provided or in some cases the blades may have more than two on the same base.

Each of the blades forms a generally triangular-shaped member which has a rear end or base 23A bolted to the bar and converges from the rear end to a front end 23B. Each of the blades has a top surface 23D and a bottom surface 23E. Each of the blades has a side edge 23F and a second side edge 23G. The sides edges are beveled from the top surface down to the bottom surface 23E so that a sharp edge is formed at the bottom surface at each of the side edges. The blades are also serrated at each cutting edge with grooves extending parallel to the bars 24 that is at right angles to a center line 23H.

The hold-down finger 16 acts to hold the blades downwardly into engagement with the top ledger surface 15A of the bottom portion 15. The bottom portion 15 has two side edges of the ledger surface 15A as best shown in FIG. 2 with those side edges 15B and 15C acting as side edges of the ledger surface 15A. Thus the cutting action of the blades occurs between the ledger 15A and the bottom surface 23E of the blade as the blade reciprocates from its position at one of the guards to its position at the next adjacent one of the guards. In this cutting action, therefore, the side edge of the blade moves across the space between the guards and enters onto the ledger surface of the next guard in a cutting action between the bottom surface of the blade and the top surface of the guard which are immediately adjacent and generally in contact or at least closely adjacent to provide a shearing action on the crop.

In these guards, the hold-down finger 16 acts to prevent the pair of blades 23A from moving away from the ledger surface 15A by applying pressure to that upper surface 23D of the blade and holding the blade in contact with or closely adjacent the ledger surface 15A of the bottom portion where the cutting action occurs. The hold-down finger 16 therefore as shown in FIG. 1 has side surfaces 16B and 16C of the bottom surface 16A which are narrower than the ledger surface 15A of the bottom portion 15.

The mounting and adjustment arrangements for the bottom portion 15 and the hold-down finger 16 can vary in accordance with a number of different designs readily available to a person skilled in the art. It suffice to say that the hold-down portion 16 is adjustable so that the gap between the bottom surface of the hold-down portion and the ledger surface of the bottom portion 15 can be adjusted to allow the sliding action of the blades while holding the blades in the required position.

The disclosures of the following documents of the present Applicants may be referred to for details of the construction not provided herein. These show various conventional details of the sickle knife system which can be used in the arrangement herein but are not described as they are known to persons skilled in the art.

U.S. Pat. No. 7,328,565 (Snider) issued Feb. 12 2008;
U.S. Pat. No. 4,894,979 (Lohrentz) issued Jan. 23, 1990
U.S. Pat. No. 4,909,026 (Molzahn) issued Mar. 20, 1990.
U.S. Pat. No. 6,962,040 (Talbot) issued Nov. 8, 2005.
US Published application 2013/0192188 (Talbot) published Aug. 1 2013.

In FIG. 1, a drive for knife bar 24 can comprise any suitable drive system known to persons skilled in this art of a type which can generate a stroke S1 of 2 inches at a drive rate of typically 918 rpm. The system can also be arranged in an alternative embodiment to drive the stroke S2 of 4 inches in which case the reciprocation rate may be lower. The drive system includes an input from a ground speed indicator which allows automatic adjusting of the stroke rate of the drive system in dependence on ground speed.

Typically each of the knife blades is generally triangular in shape with straight side edges 23F, 23G. However other shapes of the side edges 23F, 23G in plan such as convex or concave can be used. Thus the side edges 23F, 23G converge to the front apex 23K at an angle of the order of 60 degrees to the direction of reciprocating movement. The two converging side cutting edges 23F, 23G are beveled from the upper surface 23D to the bottom cutting surface 23E to cooperate with the shearing edges of the knife guards. In addition the beveled side edges are serrated with grooves running in a direction longitudinal to the reciprocating direction. In order to maximize the cutting action, the length of the cutting edge is substantially the maximum length extending from the sickle bar 24 at the rear to a position close to the front apex 23K of the blade.

At the position in the stroke shown in FIG. 1 where the center line C of the knife blades is aligned with the center line C1 of the guard fingers, the side cutting edges of the knife blades 23F, 23G substantially directly overlie the side edges 15B, 15C of the ledger surface 15A.

Each knife blade has a front point portion in front of the side cutting edges 23F, 23G which front point portion has side edges converging to the front apex 23K, where the apex and the side edges of the front point portion are shaped and arranged such that crop material engaging the front point portion, as the point portion is moved forwardly in the crop, is shed to one or other side of the front point portion for cutting by the side cutting edges and is not pushed forwardly by the front point portion 23X.

Thus the preferred construction provides a center line spacing between each knife blade and the next is of the order of or equal to 2.0 inches, the radius of curvature of the front pointed portion at the apex is less than 0.25 inch and the side edges of the front portion are arranged relative to a center line of the blade at an angle of the order of 20 degrees.

As shown in FIG. 1, the width between the centers of the guards is indicated at S1. This can be the same as the length of the cutting stroke so that the blades move from a position aligned with the center line of one guard finger to that of the next. However in some embodiments the stroke may be a multiple of the distance D, typically twice, so that the blades move from the first guard finger to the third crossing the second. The reversal of the reciprocating action at the guard center line ensure that the blades are stationary and therefore carrying out no cutting when they are overlying the guard and not at an intermediate location. The increase of the stroke length to a multiple of the finger reduces the number of times the blades are stationary but requires a reduced stroke rate due to the increased forces on the drives system.

This distance S1 is preferably of the order of 2.0 inches. The fore-aft length of a blade has traditionally been in the order of 1.75 inches from the front of the trash bar to the tip of the section, or 2.2 inches from the front edge of the knife back to the tip of the section.

It is common practice for sickle blades to have the front edge as a transverse straight edge in the order of 0.6 inches wide. The wide tip has the potential for running down crop, thus leaving long uncut stems. In the present invention the blade is designed with a pointed tip or front apex 23K, thus eliminating the problem.

The guard fingers have the upwardly facing ledger surface 15A with opposed side edges arranged to provide first and second shearing edges. The guard fingers have a downwardly facing ground engaging surface 156 shaped and arranged to provide protection for stone engagement as the fingers slide over the ground. That is each finger has sufficient strength to avoid breakage when impacting stones and obstacles causing the cutter bar to rise if the impact is sufficient and extends over sufficient number of guard fingers to provide the lifting action. This shape of the ground engaging surface is well known to persons skilled in the art and includes a longitudinal rib which is generally triangular in cross-section on the underside of the upper part containing the ledger surface. The base of the rib thus forms an apex which runs over the ground to prevent upward forces from snapping the guard finger at the ledger surface.

An upstanding transverse shoulder 157 is provided at a front edge of the ledger surface 15A and extends upwardly to a top surface 158 of the finger where the shoulder terminates. Thus there is no tang of conventional shape, that is no portion of the guard extends rearwardly over the ledger surface 15A from the shoulder 157. Above the ledger surface 15A therefore the knife blades of alternate ones of the guard fingers are free from confinement by a conventional tang as used in a conventional pointed guard or by a cooperating upper guard finger of the type used in a stub guard.

A tip portion 159 in front of the ledger surface extends forwardly from the shoulder 157 and defines a forwardmost generally pointed tip 160 for engaging crop in front of the ledger surface 15A.

Each knife guard thus includes a base portion 19 mounted on the cutter bar 13 by the two longitudinally spaced bolts 18 each of which has a head 18A engaging a bottom face of the base portion 19. The knife guard further includes three equally spaced guard fingers 15 mounted on the base portion 19 so as to be commonly mounted on the cutter bar at a first equidistant spacing in a row along the cutter bar 13.

The guard fingers are arranged also to define a first set and second set of guard fingers arranged alternately along the cutter bar so that each guard finger 151 of the first set is located between respective guard fingers 152 of the second set. Thus each triple guard defined by three fingers has either two fingers 151 either side of a finger 152 or has two fingers 152 either side of a finger 151. All of the fingers 151 and 152 are identical but as explained hereinafter, the fingers 151 are left open and have no corresponding hold-down finger, sometimes called an upper guard, whereas each of the fingers 152 cooperates with a respective one of the hold-down fingers 16.

Thus there are provided a plurality of hold-down members 161 and 162 mounted along the cutter bar. Each hold-down member 161, 162 has at least one hold-down finger 16 thereon extending forwardly from the cutter bar 13 to a position adjacent the knife blades at the ledger surfaces 15A in front of the sickle bar 24.

Thus the hold-down members 161 have a single central finger 16 mounted on a mounting base 163 and the hold-down members 162 have two separate spaced fingers 16 mounted on a mounting base 163. These are arranged on the mounting bases so that the hold-down fingers are arranged in a row at a second equidistant spacing along the cutter bar where the second equidistant spacing of the hold-down fingers 16 is double that of the first equidistant spacing of the guard fingers 15. The result of this is that the hold-down fingers 16 are arranged on the alternate guard fingers 152 leaving the guard fingers 151 open and free from a hold-down. Thus each hold-down finger 16 located in alignment with and at a spacing above a respective one of the second set 152 of guard fingers for holding down a respective one of the knife blades 23A onto the ledger surface 15A of the respective one of the second set 152 of guard fingers.

As explained previously the guard fingers 151 and 152 are pointed guards but have no conventional tang over the knife blade on the ledger surface thereof which would typically define a slot so that the knife blade 23A on the ledger surface 15A thereof is held down only by the respective guard finger 16.

Thus the guard fingers 151 of the first set each include no element at all, that is not a tang and not a hold-down over the knife blade on the ledger surface 15A so that the knife blade 23A on the ledger surface 15A of the fingers 151 is not held down at all except for the residual effect of the hold-down finger 16 over the adjacent guard finger 152.

The guard fingers 151 and 152 are identical in other respects so that particularly the length and width of the ledger surfaces 15A of the guard fingers 151 is equal to a length and width of the ledger surfaces of the second set of guard fingers.

In FIGS. 1 to 6, each of the guard fingers comprises a pointed guard finger with a pointed front tip 159, 160 in front of a front tip 23B of the knife blades 23A. This pointed guard includes the upstanding transverse shoulder 157 at a front edge of the ledger surface 15A. The spacing of the tip 22 of the hold-down fingers 16 above the respective one of the second set of guard fingers 152 is adjustable by an adjustment screw 40, 41, 42 at the cutter bar 13 independently of the other hold-down fingers 16.

Each triple knife guard is associated with a respective one of the hold-down members 161, 162 and is mounted on the cutter bar 13 commonly therewith by the pair of bolts 18. The bolts 18 are spaced apart along the cutter bar so as to engage into holes through the cutter bar aligned with holes in the base 163 of the hold-down member 161 and with corresponding holes in the base member 19 of the guard member. Similarly the hold-down member 162 is bolted by two bolts 18 onto the cutter bar 13 in association with the underlying guard member.

Figure 3:
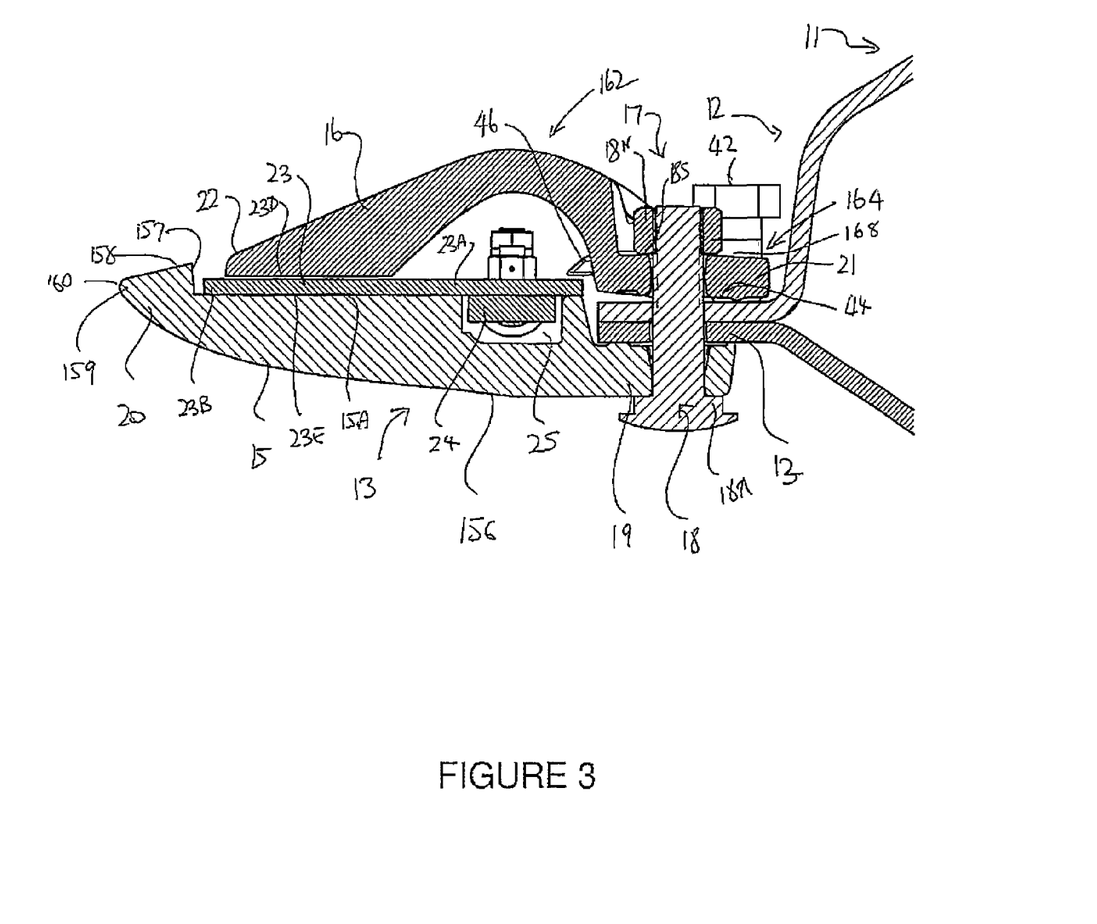
FIG. 3 is a cross-sectional view along the lines 3-3 of FIG. 1.

As shown in FIG. 3, tightening of the two bolts 18 acts to clamp the upper surface of the base 19 onto the underside of the cutter bar 13 and to clamp a bottom surface 44 of the base member 164 of the double hold-down member 162 onto the top surface of the cutter bar 13. The same arrangement is shown in FIG. 6 respect of the hold-down member 161.

As best shown in FIG. 1, the knife blades 23X and 23Y are arranged as first and second blades of a connected pair mounted on a common base 23Z carried on the sickle bar 24. These pairs are separately mounted on the bar 24 by a pair of bolts 23P and 23Q so that each pair of blades can be removed independently of the others for replacement. The reciprocating movement of the bar 24 is arranged such the blades 23X and 23Y of the connected pair 23Z are moved in the reciprocating movement between a first position shown in FIG. 1 in which the first blade 23Y is aligned with the specific hold-down finger 16X and a second position (not shown) in which the second blade 23Y of the pair 23Z is aligned with the hold-down finger 16X. Thus the finger 16X is associated with the pair 23Z and does not cooperate with any others of the blade pairs. This situation is of course repeated along the bar 24 by each of the fingers 16 and the pairs. In this way, in the event that a replacement blade pair is inserted into position on the bar 24, for example due to a breakage, it sits alongside other pairs which are older and hence are more worn and therefore thinner. Each finger 16, when adjusted as explained hereinafter to set the spacing with the respective guard finger 15, is associated with a respective blade pair and can be set in dependence on the thickness of that specific pair without any reference to the other blade pairs.

Figure 6:
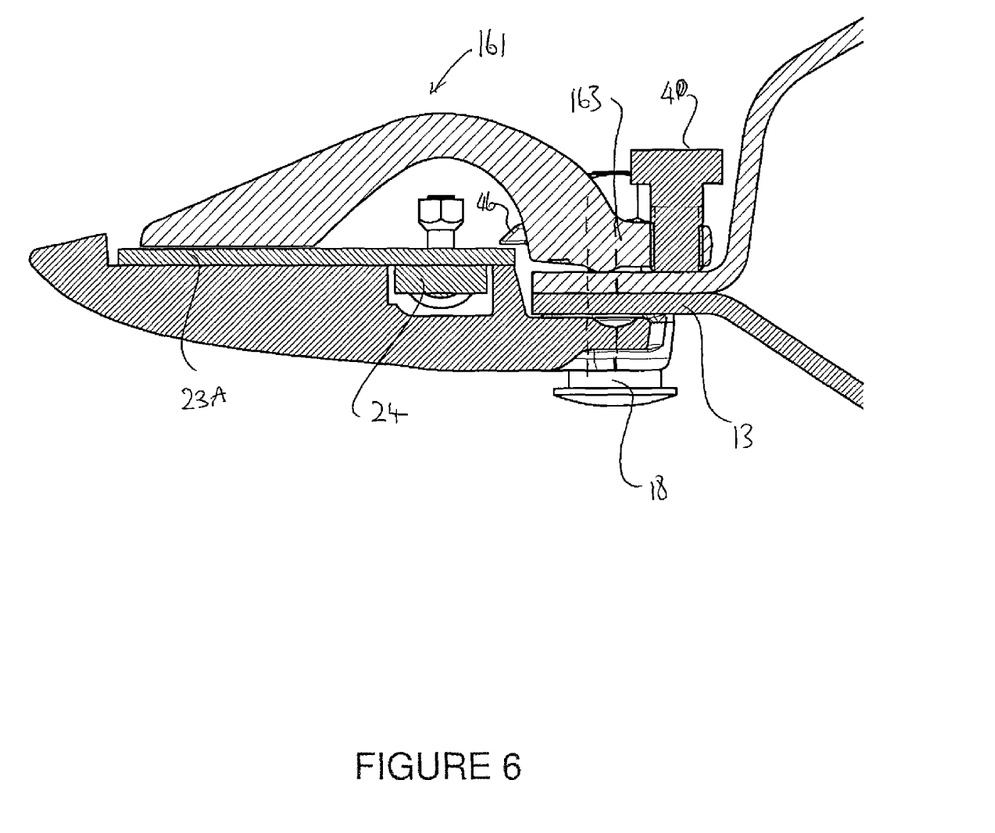
FIG. 6 is a cross-sectional view along the lines 6-6 of FIG. 1.

As shown in FIGS. 1 and 6 the single hold-down members 161 include the single finger also include a hold-down ledge 46 on each side of the single finger projecting forwardly from the base portion 163 to a position above a rear edge of a base of the knife blade. The hold-down ledge 46 covers only a narrow strip at the rear of the base of the blade so as to assist in preventing lifting of the blade when it is free from the finger 16.

In FIGS. 1 to 6, the arrangement uses pointed guards with the pointed portion in front of the tip 23B of the blade. In FIGS. 7 and 8 the arrangement uses stub guards 115 with the tip 116 of the guard 115 just behind the tip 23B of the blade, as is conventional in stub guards. In both arrangements the hold-down fingers 16 have the tip thereof just behind the tip 23B of the blade.

The stub guards 115 and the pointed guards 15 are arranged such that a user can select either the stub guards 115 or the pointed guards 15 to be mounted on the cutter bar 13 depending on cutting conditions at the choice of the user. That is the dimensions of the base portion 19 are identical in both cases to match with the holes in the cutter bar and with the bolts 18 therein. Thus the user can select all stub guards for cutting so that the blade projects beyond the guard and hold-down fingers in the conventional cutting action. Alternatively the user can select all pointed guards if the cutting conditions and the crop to be cut dictate such guards.

Figure 9:
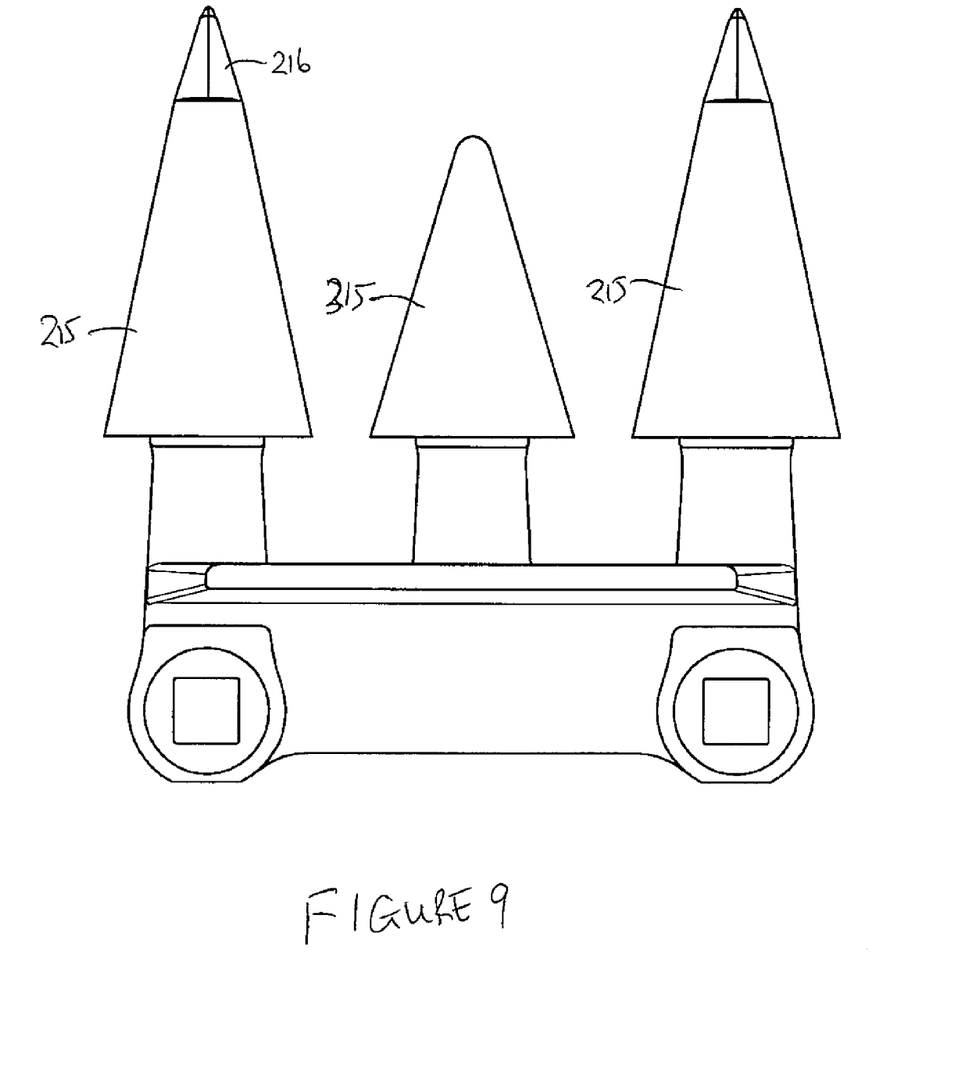
FIG. 9 is a top plan view of an alternative arrangement of guard member where alternate ones of the guard fingers and pointed guard fingers intermediate two stub guard fingers.

In an optional arrangement shown in FIG. 9 some of the guard fingers each comprise a pointed guard finger 215 with a pointed front tip 216 thereof arranged to lie in front of a front tip of the knife blades as explained above, and some of the guard fingers arranged intermediate the pointed guard fingers 215 comprise stub guard fingers 315 with a front tip thereof arranged to be behind a front tip of the knife blades as described above. In FIG. 9 there is shown a guard having three fingers where two of the fingers 215 are pointed guard fingers either side of a stub guard finger 315. In order to create and arrangement in which the pointed guard fingers alternate with the stub guard fingers there is provided a second guard not shown where there are two stub guard fingers wither side of a pointed guard finger and the two types are alternated along the cutter bar mounted on the bolts 18.

Also the stub guards 115, the pointed guards 15 and the hold-down members 16 are arranged such that the hold-down members 16 cooperate with the stub guards 115 when selected and with the pointed guards 15 when selected. That is the dimension of the hold-down members is arranged so that they overlie the ledger surface of both the stub guards when used and with the pointed guards when used. Also the pointed guards have no conventional tang so that the ledger surface of the pointed guard is presented upwardly to cooperate with the hold-down finger.

Figure 4:
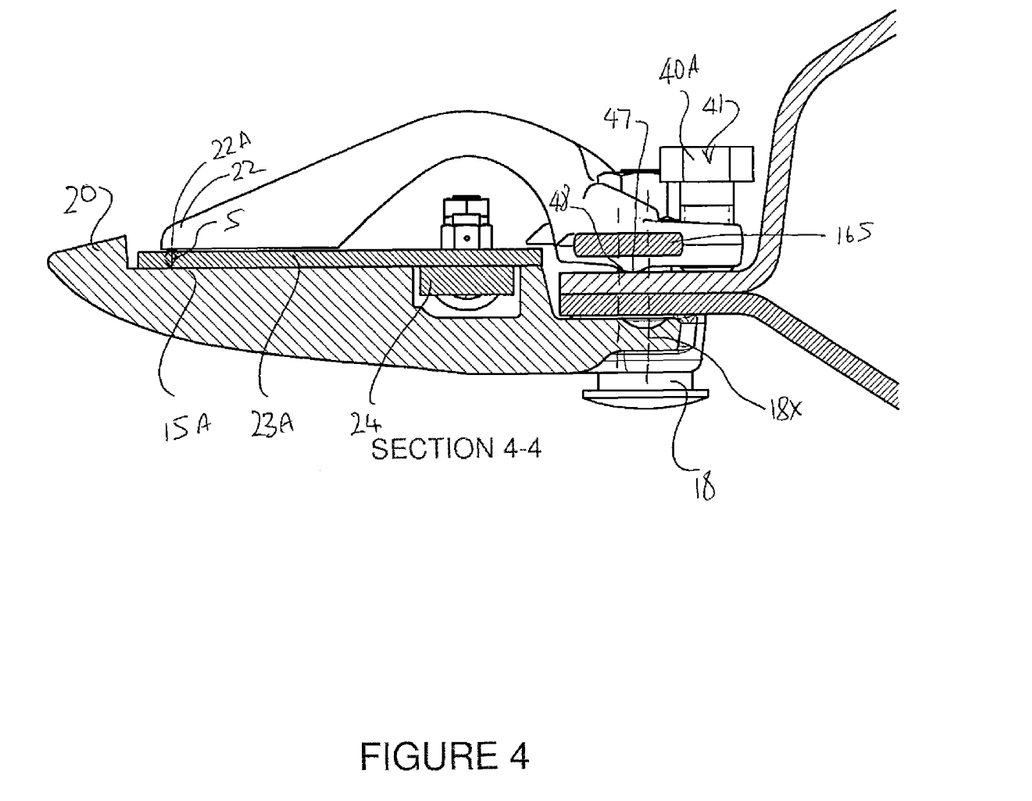
FIG. 4 is a cross-sectional view along the lines 4-4 of FIG. 1.
Figure 5:
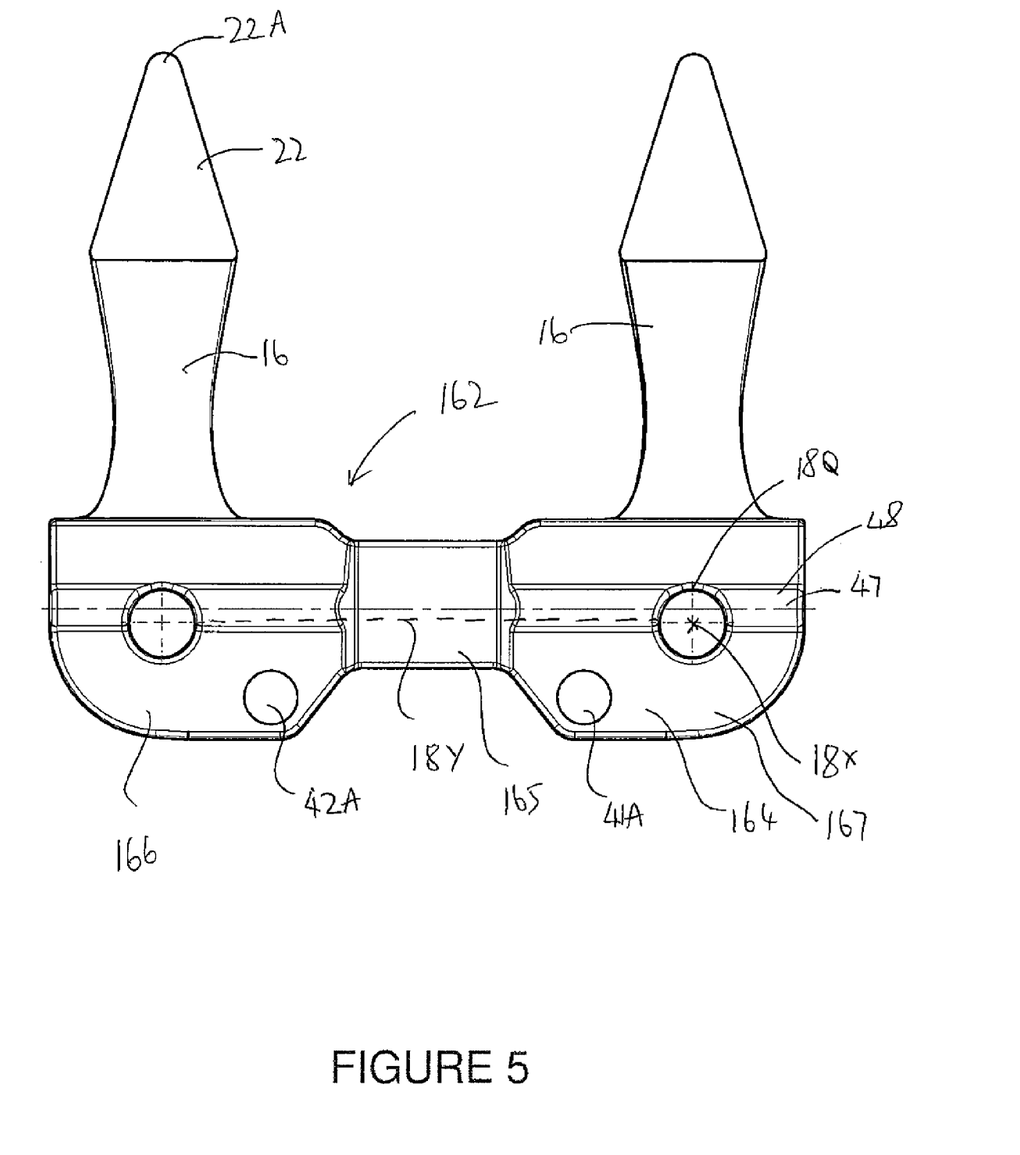
FIG. 5 is bottom plan view of a hold-down member for use in the sickle knife of FIG. 1.

As best shown in FIGS. 4 and 5, the threaded fasteners or bolts 18 have axes 18X lying at spaced positions along an imaginary line 18Y extending longitudinally of the cutter bar. The hold-down fingers are adjustable on the cutter bar to change a settable spacing S between the bottom surface 22A at the tip 22 and the ledge surface 15A of the respective guard finger 15.

In order to provide this adjustment, each of the hold-down fingers 16 is pivotal relative to the cutter bar about a fulcrum 47 defined by an apex of a rib 48 extending longitudinally of the cutter bar 13. The rib 48 and its apex 47 are located at a position slightly forwardly of the imaginary line 18Y joining the axes 18X.

The pivotal movement is carried out by a respective adjustment screw 40, 41, 12 for individual adjustment of each finger 16 by extension of the adjustment screw located on the base portion located rearwardly of the imaginary line 18Y, that is on the opposite side of the fulcrum from the finger. As shown in FIG. 5, each of the adjustment screws has a respective hole 41A, 42A in the base portion 164 of the hold-down member 162.

The base mounting member 164 connects the two hold-down fingers and defines a bridge 165 between the two hold-down fingers which is shaped to provide lateral strength and to be sufficiently flexible in torsion to provide individual adjustments of the two fingers. That is the base member 164 including the bridge 165 and the fingers extending forwardly therefrom forms an integral casting where the portions 166, 167 of the base member 164 connected to the fingers 16 are rigid relative to the fingers with the flexibility of the base member 164 being defined by the narrower bridge 165.

The fulcrum 47 and the adjustment screws 41, 42 are located relative to the imaginary line 18Y such that the hold-down fingers 16 are adjustable by extension of the respective adjustment screw to reduce the settable spacing S without adjustment or loosening of the bolts 18. This is obtained by the fact that the fulcrum 47 is only slightly forward of the imaginary line and spaced forward of the imaginary line by a distance less than a radius of the threaded fasteners, that is the fulcrum is behind the edge 18Q f the front of the bolts 18. This adjustment to reduce the space S as the blades wear obtained by extending the bolts 41, 42 is obtained because the fulcrum is located such that there is slight sliding movement of the fulcrum rearwardly when the adjustment screw 41, 42 is extended.

Each adjustment screw 40, 41 comprises a bolt with a head 40A projecting upwardly from a top surface of the hold-down member so that the head can be grasped by a wrench for application of a significant adjustment force.

As the hold-down member is an integral member with a bottom surface including the fulcrum directly contacting the upper surface of the cutter bar 13, there are no intervening elements which need to be adjusted such as adjustment bars or shims.

The bolts 18 each include a nut 18N with a shoulder 18S engaging an upper surface 16S of the hold-down member and the upper surface 18S is arched or convexly curved so as to include a curved surface at least rearwardly of the imaginary line and preferably on both sides of the common line to allow rotation of the hold-down member on the shoulder during the extension of the adjustment screw.

The double hold-down members 162 include therefore two adjustment screws 41, 42 for individual adjustment of the fingers. The single hold-down members 161 have a single center adjustment screw 40 to adjust the single finger so that no flexing of the member 161 is required.

The invention claimed is:

1. A sickle cutting apparatus comprising:
a plurality of stationary knife guards arranged to be mounted along a cutter bar;
a sickle bar mounted in transversely extending position and arranged to be driven for reciprocating movement relative to said knife guards;
the sickle bar having a plurality of knife blades mounted thereon for movement therewith;
each of the knife blades having a cutting surface for passing across the knife guards;
each of the knife blades having on first and second sides first and second side cutting edges;
each knife guard comprising:
a base portion arranged to be mounted on the cutter bar;
at least one guard finger mounted on the base portion so that the guard fingers are arranged to be mounted in a row along the cutter bar;
each guard finger having an upwardly facing ledger surface with opposed side edges thereof arranged to provide first and second shearing edges which cooperate with said side cutting edges of said knife blades;
and a plurality of hold-down members arranged to be mounted along the cutter bar;
each hold-down member comprising a base mounting member arranged to be attached to the cutter bar;
each hold-down member comprising two hold-down fingers thereon carried on the base mounting member arranged to be at positions spaced longitudinally of the cutter bar so as to be cantilevered forwardly from the cutter bar to a position of a front tip of each hold-down finger located at a settable spacing in front of the sickle bar above the ledger surface of a respective one of the guard fingers;
wherein each of the base mounting members is arranged to be attached to the cutter bar by at least two threaded fasteners passing through the cutter bar and through the base mounting member which can be adjusted to tighten the base mounting member onto the cutter bar;
the threaded fasteners having axes of the threaded fasteners lying at spaced positions along an imaginary line longitudinally of the cutter bar;
wherein each of said hold-down fingers is arranged to be adjustable on the cutter bar to change said settable spacing thereof;
wherein each of said hold-down fingers is pivotal relative to the cutter bar about a fulcrum extending longitudinally of the cutter bar and located at a position forwardly of said imaginary line;
wherein each of the two hold-down fingers includes a respective adjustment screw for individual adjustment of each of the hold-down fingers by extension of the respective adjustment screw, where each of the adjustment screws is located at a position rearwardly of said imaginary line;
and wherein the two hold-down fingers are connected by an arrangement which is which is shaped and arranged to provide lateral strength between the two hold-down fingers and to be sufficiently flexible to allow twisting thereof to provide said individual adjustments by allowing each of the hold-down fingers to be adjusted independently of the other.

2. The apparatus according to claim 1 wherein said fulcrum and said adjustment screws are located relative to said imaginary line such that said hold-down fingers are adjustable by extension of said respective adjustment screw to reduce said settable spacing without adjustment of said threaded fasteners.

3. The apparatus according to claim 1 wherein the fulcrum is arranged at a position spaced forward of said imaginary line by a distance less than a radius of the threaded fasteners.

4. The apparatus according to claim 1 wherein the fulcrum is located such that there is slight sliding movement of the fulcrum rearwardly when the adjustment screw is extended.

5. The apparatus according to claim 1 wherein the fulcrum comprises an apex of a rib along the base mounting member arranged longitudinally of the cutter bar.

6. The apparatus according to claim 1 wherein the hold-down member including the hold-down fingers and the base mounting member comprises an integral member with a bottom surface including the fulcrum arranged to directly contact an upper surface of the cutter bar with no intervening elements.

7. The apparatus according to claim 1 wherein the threaded fasteners each include a shoulder engaging an upper surface of the hold-down member and wherein the upper surface includes a curved surface at least forwardly of the imaginary apex line to allow rotation of the hold-down member on said shoulder during said extension of the adjustment screw.

8. The apparatus according to claim 1 wherein each of the guard fingers comprises a stub guard finger with a front tip thereof behind a front tip of the knife blades.

9. The apparatus according to claim 1 wherein each of the guard fingers comprises a pointed guard finger with a pointed front tip thereof in front of a front tip of the knife blades.

10. A sickle cutting apparatus comprising:
a plurality of stationary knife guards arranged to be mounted along a cutter bar;

a sickle bar mounted in transversely extending position and arranged to be driven for reciprocating movement relative to said knife guards;

the sickle bar having a plurality of knife blades mounted thereon for movement therewith;

each of the knife blades having a cutting surface for passing across the knife guards;

each of the knife blades having on first and second sides first and second side cutting edges;

each knife guard comprising:
 a base portion arranged to be mounted on the cutter bar;
 at least one guard finger mounted on the base portion so that the guard fingers are arranged to be mounted in a row along the cutter bar;
 each guard finger having an upwardly facing ledger surface with opposed side edges thereof arranged to provide first and second shearing edges which cooperate with said side cutting edges of said knife blades;

and a plurality of hold-down members arranged to be mounted along the cutter bar;

each hold-down member comprising a base mounting member arranged to be attached to the cutter bar;

each hold-down member comprising two hold-down fingers thereon carried on the base mounting member arranged to be at positions spaced longitudinally of the cutter bar so as to be cantilevered forwardly from the cutter bar to a position of a front tip of each hold-down finger located at a settable spacing in front of the sickle bar above the ledger surface of a respective one of the guard fingers;

wherein each of the base mounting members is arranged to be attached to the cutter bar by at least two threaded fasteners passing through the cutter bar and through the base mounting member which can be adjusted to tighten the base mounting member onto the cutter bar;

the threaded fasteners having axes of the threaded fasteners lying at spaced positions along an imaginary line longitudinally of the cutter bar;

wherein each of said hold-down fingers is arranged to be adjustable on the cutter bar to change said settable spacing thereof;

wherein each of said hold-down fingers is pivotal relative to the cutter bar about a fulcrum extending longitudinally of the cutter bar and located at a position forwardly of said imaginary line;

wherein each of the two hold-down fingers includes a respective adjustment screw for individual adjustment of each of the hold-down fingers by extension of the respective adjustment screw, where each of the adjustment screws is located at a position rearwardly of said imaginary line;

wherein the two hold-down fingers are connected by a single bridge member which defines a bridge between the two hold-down fingers which is shaped and arranged to provide lateral strength between the two hold-down fingers and to be sufficiently flexible to allow twisting thereof to provide said individual adjustments by allowing each of the hold-down fingers to be adjusted independently of the other;

and wherein the single bridge member is arranged such that the guard fingers are separated and unconnected to each other all the way back to the sickle bar.

11. The apparatus according to claim 10 wherein each hold-down finger is arranged to be located in alignment with and at a spacing above a respective one of the guard fingers for holding down a respective one of the knife blades onto the ledger surface of the respective one of the guard fingers.

12. The apparatus according to claim 10 wherein each of the guard fingers comprises a pointed guard finger with a pointed front tip thereof in front of a front tip of the knife blades.

13. The apparatus according to claim 10 wherein at least some of the hold-down members include a hold down ledge arranged above a rear edge of a base of the knife blade.

14. The apparatus according to claim 10 wherein the hold-down fingers extend to a position closely adjacent a front tip of the knife blade.

* * * * *